Jan. 5, 1971 IWAO NOGAMI 3,553,591

METHOD FOR CONTROLLING MODULUS OF BINARY MODULUS MULTIPLYING CIRCUIT BY BINARY COUNTER CIRCUIT

Filed Aug. 30, 1968

INVENTOR
IWAO NOGAMI
BY G. Donald Weber, Jr.
ATTORNEY

United States Patent Office 3,553,591

Patented Jan. 5, 1971

3,553,591

METHOD FOR CONTROLLING MODULUS OF BINARY MODULUS MULTIPLYING CIRCUIT BY BINARY COUNTER CIRCUIT

Iwao Nogami, Tokyo, Japan, assignor to Honeywell Inc., Minneapolis, Minn., a corporation of Delaware Filed Aug. 30, 1968, Ser. No. 756,623
Claims priority, application Japan, Sept. 11, 1967, 42/57,881
Int. Cl. H03k 21/00
U.S. Cl. 328—46 1 Claim

ABSTRACT OF THE DISCLOSURE

A series of binary $n$-digit counter circuit and a series of binary $n$-digit modulus multiplying circuit are connected by means of a series of gate circiuts. An output of the $m$th digit of the binary $n$-digit counter circuit is supplied to the gate circuit with an output of the $(n-m+1)$ the digit of the binary $n$-digit modulus multiplying circuit. The input signals of the binary $n$-digit modulus multiplying circuit can be controlled by the input signals of the binary $n$-digit counter circuit to obtain a controlled modulus.

BACKGROUND OF THE INVENTION

This invention concerns a method to control the modulus of a binary modulus multiplying circuit by a number of pulses counted by a binary counter circuit.

SUMMARY OF THE INVENTION

A series of binary $n$-digit counter circuits is connected to a series of binary $n$-digit modulus multiplying circuits through a series of gate circuits. The variation in the output of the binary $n$-digit counter circuits is supplied to the gate circuit with the variation in the output of the binary $n$-digit modulus multiplying circuit. The input signals applied to the binary $n$-digit modulus multiplying circuits are controlled by the input signals applied to the binary $n$-digit counter circuits to obtain a controlled modulus at the output of the gate circuit.

According to the modulus controlling method of this invention, it is possible to convert the counted number into frequency or perform the operation of the counter number.

DESCRIPTION OF THE PREFERRED EMBODIMENTS

Figures 1, 2:
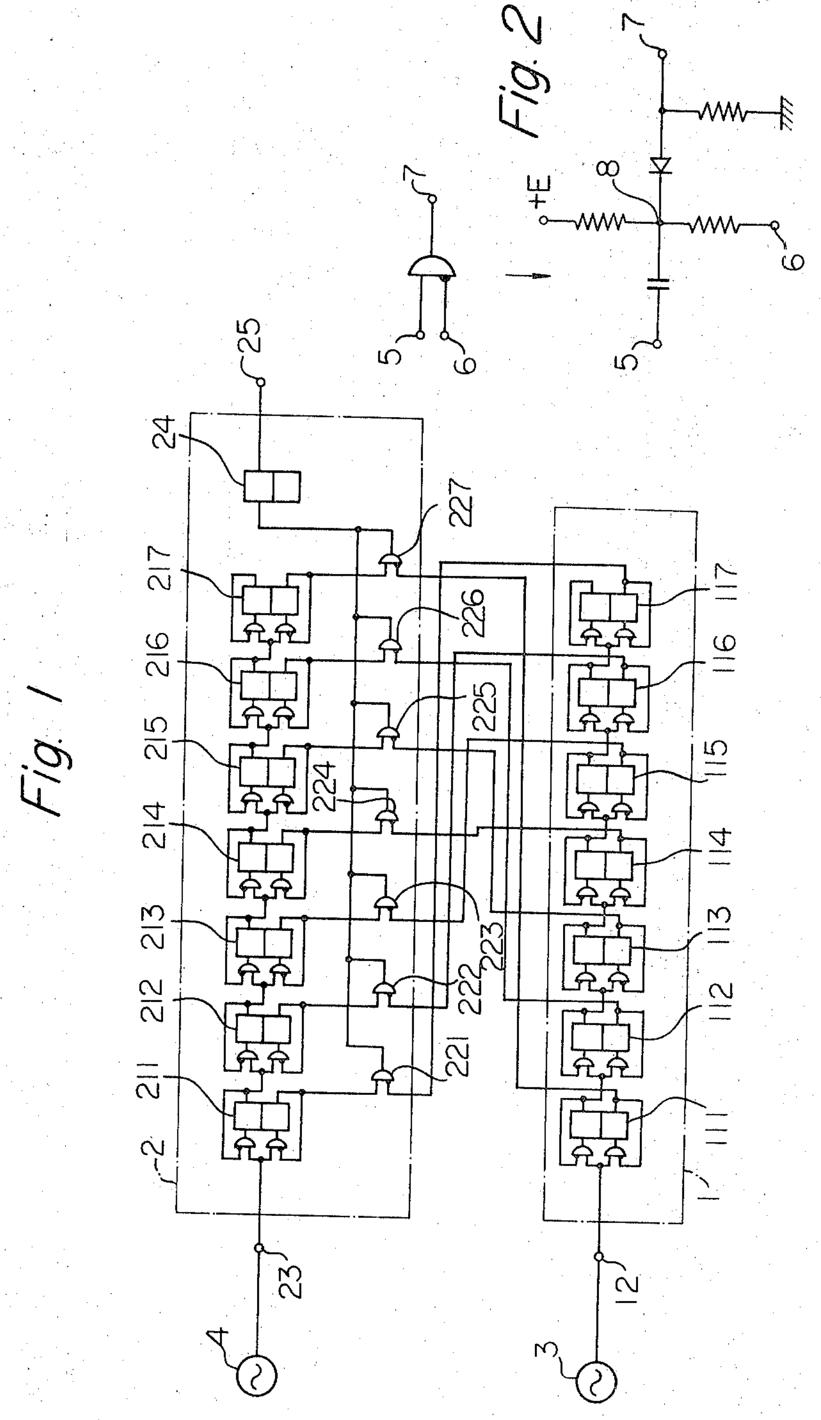
FIG. 1 is a skeleton diagram showing an embodiment of a circuit to perform the modulus controlling method of this invention.
FIG. 2 is a connection diagram showing an embodiment of the differential gate used in the circuit shown in FIG. 1.

FIG. 1 shows an example of $n=7$ in the case of a well known binary $n$-digit counter circuit 1. Well known flip-flop circuits 111–117 count the pulses given to an input terminal 12 from a signal source 3. An example of $n=7$ of a well known binary $n$-digit modulus multiplying circuit 2 is shown. Well known flip-flop circuits 211–217 form a binary $n$-digit counter circiut and count the pulses given to an input terminal 23 from a signal source 4.

If there are $2^n$ input pulses in binary $n$-digit counter circuit 1, each digit repeats set and reset the following number of times respectively.

| | Times |
|---|---|
| 1st digit | $2^{n-1}$ |
| 2nd digit | $2^{n-2}$ |
| . | |
| . | |
| . | |
| $(n-1)$th digit | $2^1$ |
| $n$th digit | $2_0$ |

As the various digits do not perform the set at the same moment, if the variation of the state at the moment of set is taken out, it is possible to obtain the output pulses of the number corresponding to the above times of repeating.

The circuit shown in FIG. 2 is an embodiment of differential gates 221–227. In FIG. 2, the pulse signal applied to a terminal 5 is differentiated, but as the potential of a differentiating point 8 becomes +E when the potential of a gate terminal 6 is +E, no output appears over an output terminal 7. When the potential of gate terminal 6 becomes 0, the potential of differentiating point 8 lowers and the differentiated pulses appear over output terminal 7.

Mono-stable multivibrator 24 of FIG. 1 is triggered by the differentiated pulses appearing across output terminal 7 and the output pulses are formed, which are taken out from an output terminal 25.

Thus, by means of varying the potential of gate terminal 6, the output pulses can be made intermittent. On the other hand, the digits of binary $n$-digit counter circuit 1 become "1" when the pulses of the following numbers are counted.

| | |
|---|---|
| 1st digit | 1 |
| 2nd digit | 2 |
| . | |
| . | |
| . | |
| $(n-1)$th digit | $2^{n-2}$ |
| $n$th digit | $2^{n-1}$ |

When the flip-flop becomes "1," the output of its set side becomes +E and the output of its reset side becomes 0.

It can be seen from the above fact that if the reset side output of the $m$th digit of binary $n$-digit counter circuit 1 is connected to the gate terminal of the $(n-m+1)$th digit of binary $n$-digit modulus multiplying circuit 2, the counted number of the binary counter circuit becomes the modulus of the binary modulus multiplying circuit and it is possible to get across output terminal 25 the output pulses of the number obtained by multiplying the pulses given to input terminal 23 from signal source 4 by the modulus.

As stated above, it is possible, by applying the variation in the output condition of the binary $n$-digit counter circuit to the binary modulus multiplying circuit through the differential gate, to obtain across the output terminal an output signal which controls the input signal from signal source 4 by the input signal from signal source 3.

What is claimed is:

1. Method for controlling the modulus of a binary modulus multiplying circuit by the counted number of a binary counter circuit comprising: a series of binary $n$-digit counter circuits, $n$ gate circuits and a series of binary $n$-digit modulus multiplying circuits, the output of the $m$th digit of said binary $n$-digit counter circuit being connected to said gate circuits with the output of the $(n-m+1)$th digit of said binary $n$-digit modulus multiplying circuit to control the modulus of said binary $n$-digit multiplying circuit by the counted number of said binary counter circuit.

References Cited

UNITED STATES PATENTS 3,200,339 8/1955 Gorlin -------------- 328—46

STANLEY T. KRAWCZEWICZ, Primary Examiner

U.S. Cl. X.R.

307—225